March 26, 1957 — E. G. WELTER — 2,786,411
INDICATING MEANS IN CHECK WRITERS
Filed Jan. 27, 1954 — 5 Sheets-Sheet 1
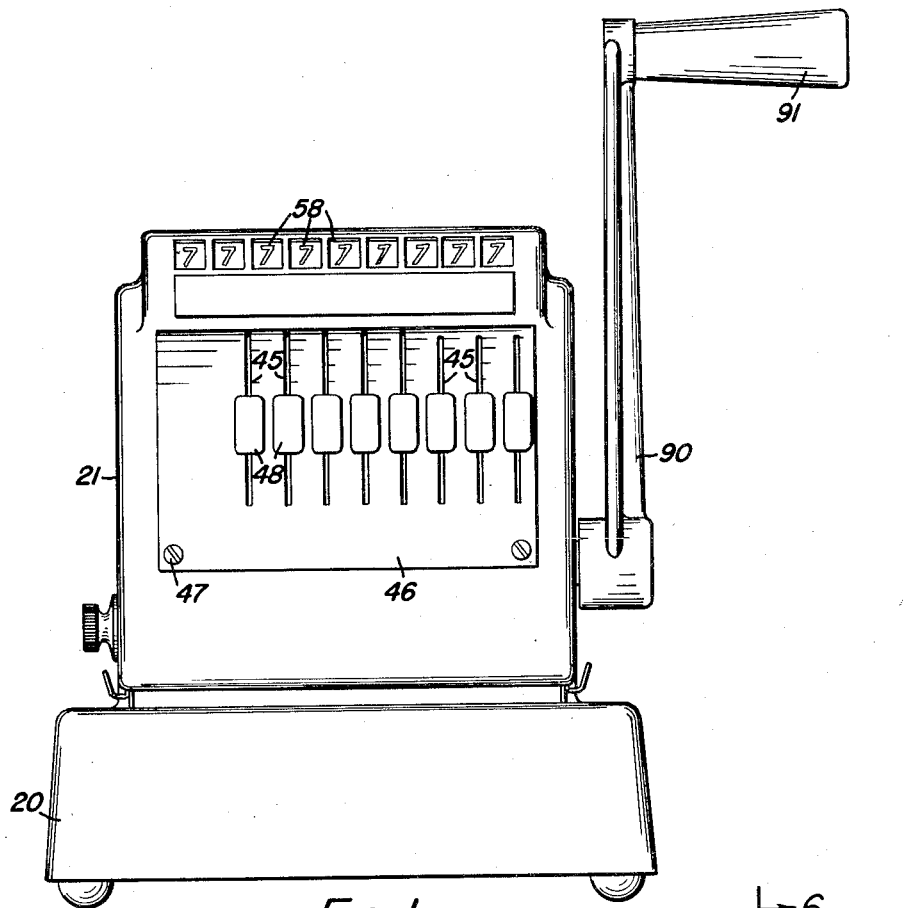
FIG. 1.
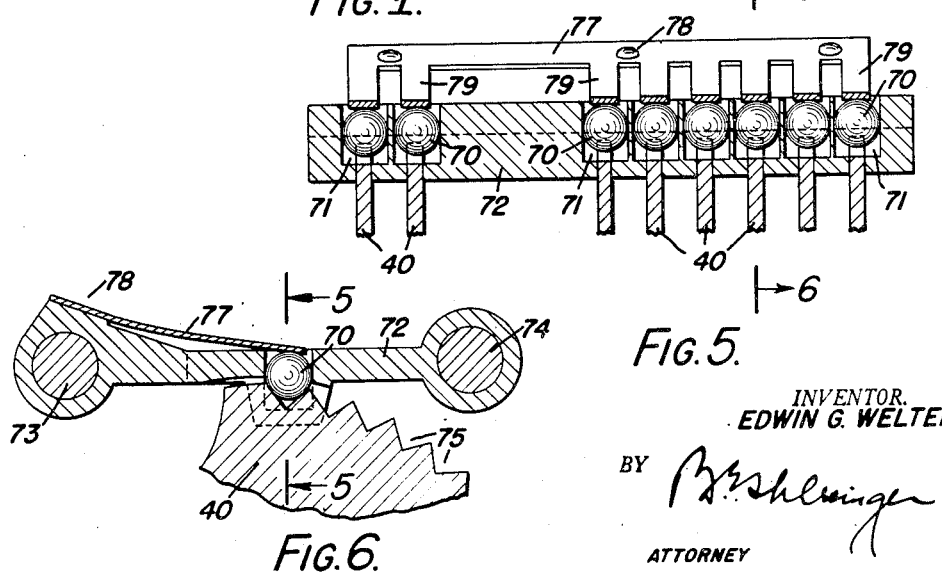
FIG. 5.
FIG. 6.
INVENTOR.
EDWIN G. WELTER
BY
ATTORNEY March 26, 1957 E. G. WELTER 2,786,411
INDICATING MEANS IN CHECK WRITERS
Filed Jan. 27, 1954 5 Sheets-Sheet 2

INVENTOR.
EDWIN G. WELTER
BY
ATTORNEY

INVENTOR.
EDWIN G. WELTER

March 26, 1957     E. G. WELTER     2,786,411
INDICATING MEANS IN CHECK WRITERS
Filed Jan. 27, 1954     5 Sheets-Sheet 4

INVENTOR.
EDWIN G. WELTER
BY
ATTORNEY

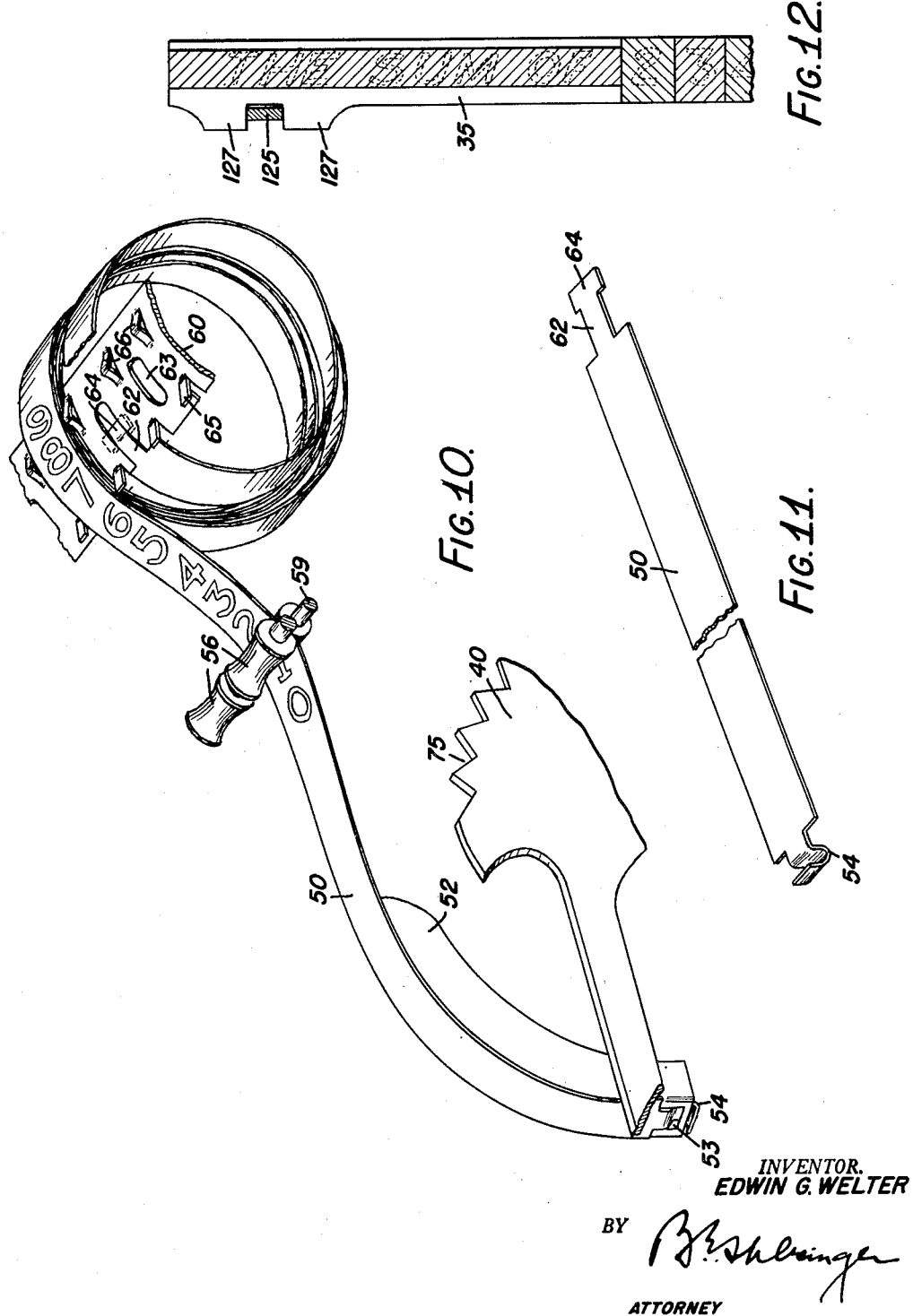

United States Patent Office 2,786,411
Patented Mar. 26, 1957

2,786,411

INDICATING MEANS IN CHECK WRITERS

Edwin G. Welter, Rochester, N. Y., assignor to Hall-Welter Company, Inc., Rochester, N. Y., a corporation of New York Application January 27, 1954, Serial No. 406,463

5 Claims. (Cl. 101—20)

The present invention relates to check writers, and more particularly to check writers of the set-up type in which independently movable type carriers are manipulated to form a printing line. In a more specific aspect, the invention relates to an improvement on the check writer disclosed in U. S. Patents Nos. 1,959,186 and 2,029,646, granted May 15, 1934, and February 4, 1936, respectively.

The check writer of the present invention, like the check writer of the patents above mentioned, has a plurality of printing segments, each of which has numerals 0 to 9 arranged in a column of type around its segmental periphery. Each segment also has an arm secured to it by which it may be rotated about its axis to bring into printing position selectively any one of the type numerals which it carries. Each segment also has means for visually indicating, through successive numerals 0 to 9 arranged in a column, the numeral set-up to be printed. Means is provided, too, for releasably locking the several segments in their set-up positions. The check writer of the present invention also has a removable type bar, the printing face of which may bear any desired word or mark of identification.

Heretofore, each printing segment has been set by use of indicating numerals arranged in a column on a metal strap that is secured to the segment to move therewith. This metal strap lies just above and is supported by a segment concentric with, secured to and movable with the printing segment. This has meant that the machine has been rounded at its top to follow the curvature of the supporting segments with the result that the indicating numerals are below the normal line of vision and therefore not as readily visible as might be desirable through the viewing windows of the machine.

Heretofore, also, the removable type bar has had a fixed printing position, and any space between it and the first digit of the amount to be imprinted on a check has had to be filled in by "X's" or stars or other characters.

One object of the present invention is to provide a check writer of the character described in which the numerals used in setting up the machine are more readily visible than in machines of previous constructions.

Another object of the invention is to provide a check writer of the character described in which the set-up operation is almost frictionless.

A further object of the invention is to provide a simpler, less expensive visual indicating means for setting up the machine.

Another object of the invention is to provide an improved detent means for holding the printing segments in adjusted positions.

Another object of the present invention is to provide a check writer in which the removable type bar is moved atuomatically, after the machine has been set-up, so that it will imprint its legend immediately to the left of the sum printed on the check.

Still further objects of the invention are to provide an improved check writer of the character described which is simple in construction, positive in operation, and which will not be liable to get out of order.

Other objects of the invention will be apparent hereinafter from the specification and from the recital of the appended claims.

In the drawings:

Fig. 1 is a front elevation of a check writer built according to one embodiment of this invention;

Fig. 5 is a fragmentary section on an enlarged scale taken on the line 5—5 of Fig. 6 and showing the means for locking the printing segments in adjusted positions;

Fig. 6 is a section taken on the line 6—6 of Fig. 5, and looking in the direction of the arrows;

Fig. 10 is a perspective view on an enlarged scale illustrating one of the indicating tapes and showing the manner in which it is connected to its printing segment;

Fig. 11 is a fragmentary perspective view of one of the indicating tapes;

Fig. 12 is a bottom view of the removable type bar and of three of the printing segments and illustrating how the type bar is shifted to abut against the printing segment that is furthermost to the left;

Figure 2:
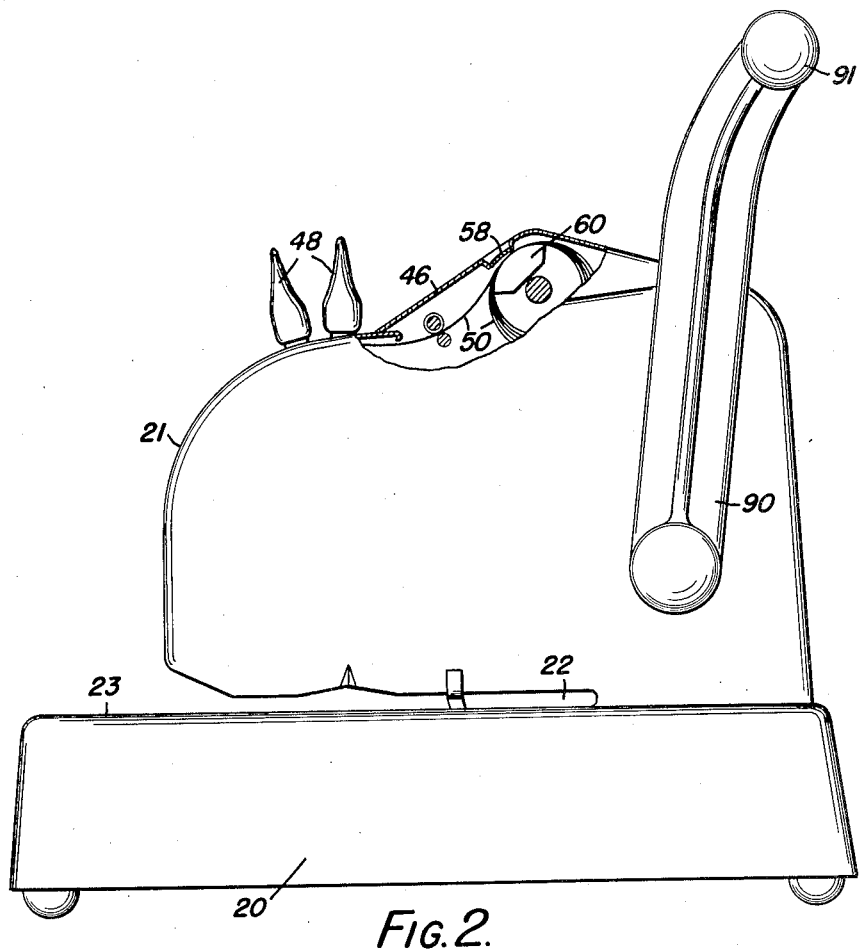
Fig. 2 is a side elevation of this machine with parts broken away.

Referring now to the drawings by numerals of reference, the machine is shown as having a base section 20 and a top section 21. The latter overhangs the base to provide a slot opening 22 between the sections for receiving the check which is to be protected. The check rests on a top plate 23 for the base which has transverse openings therethrough through which the platens 80 (Fig. 3) are raised in their operative movements.

Figure 3:
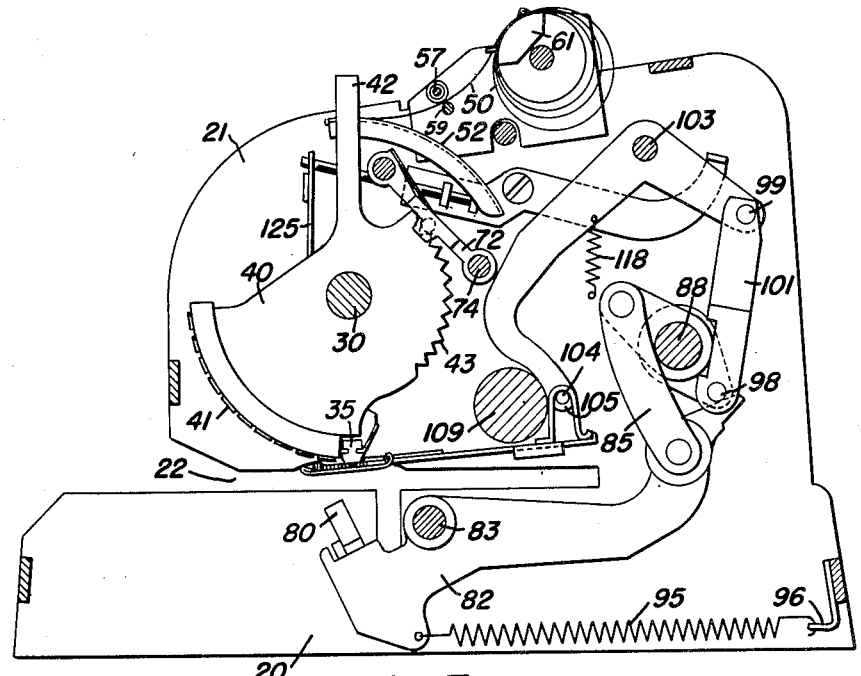
Fig. 3 is a vertical section in a plane parallel to the plane of Fig. 2 and showing the parts in zero position.
Figure 4:
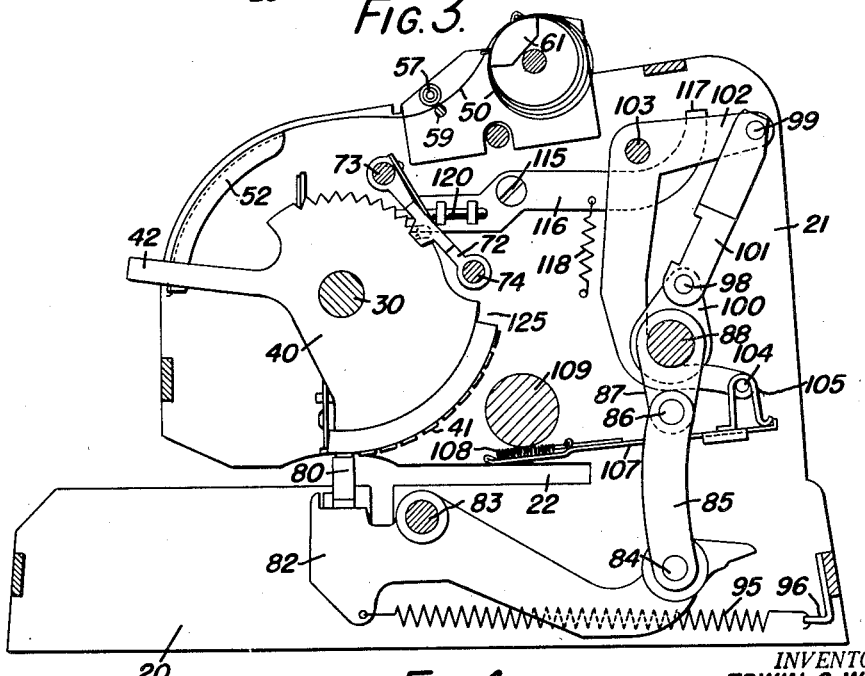
Fig. 4 is a section similar to that of Fig. 3 but showing a printing segment in another adjusted position and in the process of printing.
Figure 7:
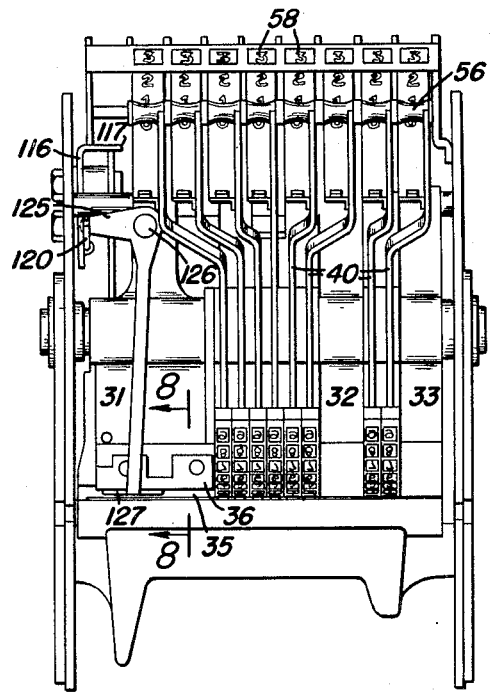
Fig. 7 is a view, with parts broken away, showing the several printing segments and the means for shifting the removable type bar.
Figure 8:
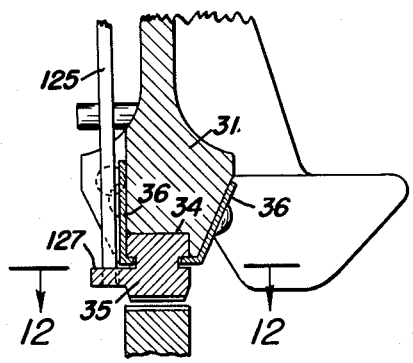
Fig. 8 is a section on the line 8—8 of Fig. 7 looking in the direction of the arrows and on an enlarged scale.

Inserted in axially aligned openings in the top portion 21 is a transversely extending, non-rotatable shaft 30 (Figs. 3 and 4). The shaft 30 carries printing members 31, 32 and 33 (Figs. 7 and 9) arranged in spaced relation to each other. These members may be of the same structure as described in Patent No. 1,959,186 and are anchored against rotary displacement. The bottom of the intermediate member 32 has a type face bearing the abbreviation "Dols." The right hand member 33 has a similar type face bearing the abbreviation "Cts"; and the bottom of the left hand and wider member 31 is formed in the direction axial of the shaft 30 with a channel 34 (Fig. 8) which is open at one end to receive a removable type bar 35. The printing face of this type bar may bear any desired work or mark of identification such, for instance, as the payor's name, or the words "The sum of." This bar is yieldingly held against vertical displacement by spring plates 36 which are secured to the converging sides of the bottom portion of the member 31, the sides of the bar 35 being slotted to receive the inturned ends of these plates.

Interposed between the fixed members 31 and 32 and independently rotatable on the shaft 30 are a group of plates 40 (Figs. 3 and 4), each of which embodies a printing segment 41, a manipulating arm or projection 42, and a series of ratchet teeth 43. Each of the printing segments has a series of type forms comprising the numerals 0 to 9 inclusive and reading clockwise from the bottom. Arranged between the fixed segments 32 and 33 are two other printing segments 40 similar to the segments already described. The manipulating arms 42 of the segments 40 project through slots 45 (Fig. 1) in a front cover plate 46 which is secured to the upper portion of the machine by screws 47. This plate 46 has a curvature concentric with the shaft 30. Each of the arms 42 carries a detachable finger piece 48 for easy manipulation.

For visual indication of the set-up there is secured to each arm 42 a flexible indicating tape 50 (Fig. 10). Each arm 42 carries a rearwardly extending segmental arm 52 (Figs. 10, 3 and 4), the fore end of which is provided with an opening 53 for receiving a hook 54 formed on one end of the flexible tape 50. The tape has printed on it the numerals 0 to 9 corresponding to the characters on the printing segment 41 to which it is secured.

The tapes or straps 50 are of flat resilient material, such as hardened spring steel or plastic, which will normally coil upon itself in a spiral without buckling, as shown in Fig. 10. These tapes or straps are disposed to pass between spools 56 and rods 59 (Figs. 3 and 4). Spools 56 are carried by a rod 57 which is secured at opposite ends in the opposite side walls of the upper portion 21 of the machine. The tapes pass under windows 58 (Fig. 1) provided in the upper section 21 of the housing; and they are connected at their rear ends to a curved plate 60 (Fig. 10) which has downturned portions 61 (Fig. 4) at opposite ends that are riveted or otherwise fastened to the sides of the upper section 21 of the machine. Each of the tapes 50 has at its rear end a narrow neck portion 62 (Fig. 11) which is adapted to be inserted through an elongate slot 63 (Fig. 10) in the plate 60; and each tape has a tab portion 64 at its extreme rear end which serves to retain the tape to the plate 60 after the neck portion 62 has been passed through the slot 63. The plate 60 has lugs 65 and aligned raised portions 66 struck up therefrom, which form guide channels to retain each of the tapes in its proper position.

There is one transparent window 58 for each strip 50 for viewing the characters on the strip 50 as the characters are moved past the window by movement of the key or finger grip 48. Thus, when a key 48 is moved forward the associated flexible strap 50, which is normally coiled about the plate 60, is drawn forward. The strap rides under the roller 56, being pulled far enough forward until the desired numeral is read under the window 58. The plate 60 is positioned far enough above the segment 52 so that the numerals read through the window 58 are tilted to be easily visible. The corresponding set-up of the printing segments is thus known before the printing operation is performed.

The plates 40 are adapted to be locked in position by ball detents 70 (Figs. 5 and 6) which are mounted in recesses 71 in a die-cast bar 72 that is mounted at opposite ends on two parallel rods 73 and 74 (Figs. 3, 4 and 6) which are secured at opposite ends in the sides of the upper section of the machine. The balls 70 are adapted to engage in the notches 75 of ratchet teeth 43 the plates 40. There is one ball detent 70 for each plate 40. The ball detents are resiliently held in engagement with the notches 75 by a comb-shaped leaf spring 77 (Figs. 5 and 6) which is secured by rivets 78 to the die-casting 72. The resilient member 77 is provided with as many teeth or projections 79 as there are balls 70 and plates 40, one of the resilient projections 77 engaging one of the balls 70. Thus, each plate 40 is resiliently held in the position to which it is moved.

Cooperating with the printing segments 41 is a platen 80 (Figs. 3 and 4) which is in the form of a bar that is secured to the forward end of an arm 82 which is pivoted on a shaft 83 that is mounted against rotation in the sides of the base 20. The rear and longer arm of the lever 82 has pivotal connection at 84 with a link 85 which in turn is pivotally connected at 86 with a toggle member 87 that is fixed to a transversely extending shaft 88 which is journaled at opposite ends in the sides of the upper section 21.

The shaft 88 is rotated by means of a lever 90 (Fig. 1) which is secured thereto and which is provided with an operating handle 91. A forward throw of the lever 90 effects through the toggle connection comprising the arm 87 and link 85 (Fig. 4) a movement of the lever 82 which causes the platen 80 to be raised through the opening in the bed plate of the machine. The check, which is to be imprinted and which lies on the plate 23 (Fig. 2), is thus forcefully pressed against the line of set-up type. This movement of the platen is against the action of a coil spring 95 (Fig. 4) which is attached to the lever 82 at its forward end and which is secured at its rear end to a clip 96 that is fastened to the base of the machine. The spring 95 serves to return the operating lever 90 and the parts controlled thereby to inoperative position when the handle 91 is released.

Figure 9:
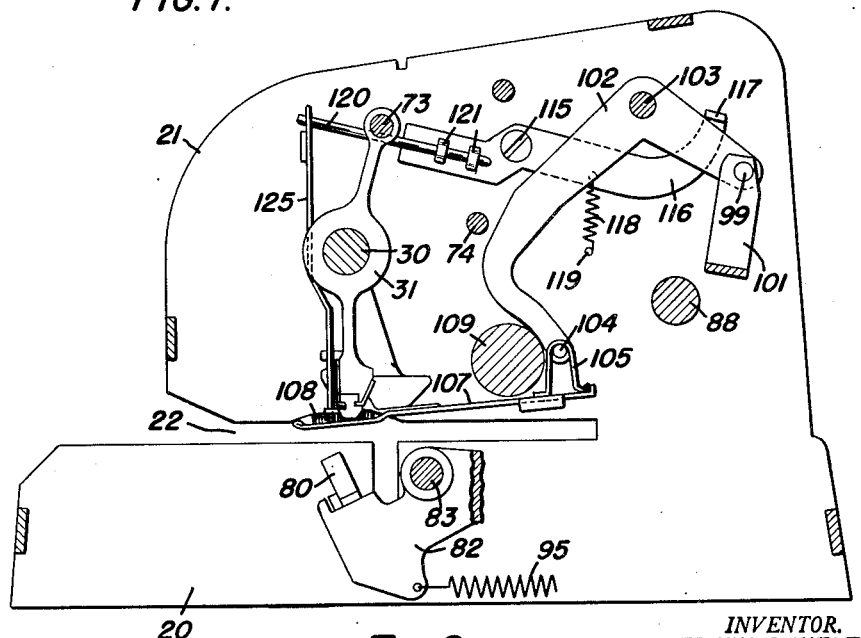
Fig. 9 is a section in a plane parallel to the section of Figs. 3 and 4, further showing the means for operating the removable type bar.

The types are automatically inked at each operation of the lever 90. Fixed to the operating shaft 88 adjacent one side wall of the casing is an arm 100 (Fig. 4) which is connected by a link 101 with one arm of a bell-crank lever 102. This lever is fulcrumed on a rod 103 which extends transversely of the casing and which is fixed at its opposite ends in the side walls of the casing. The other arm of the lever 102 carries a pin 104 which engages in a U-shaped keeper or strap 105. This keeper or strap 105 is fastened to a reciprocatory plate 107. The plate 107 carries an ink pad 108 which is inked from an ink roll 109 on each reciprocation of the plate 107 and which at the forward end of its stroke, as shown in Fig. 9, serves to ink the type of the printing segments 41 that are in printing position. The plate 107 is moved rearward when the operating lever 90 is thrown forward, and is moved forwardly when the lever 90 returns to its inoperative position.

Pivotally mounted on a screw headed stud 115 (Figs. 4 and 9) that is secured in the right hand side of the upper section 21 is a lever 116. This lever has a lug 117 bent laterally from it at its rear end which is adapted to engage the short arm of that bell-crank lever 102 which is furthermost to the left. Thus, as this lever 102 is rocked clockwise from the position shown in Fig. 4 to that of Fig. 9 the lever 116 is rocked clockwise, also, by the spring 118 which is secured at one end to this lever 116 and at its opposite end to a pin 119 which is fastened to the casing. The lever 116 carries at its forward end a leaf spring 120 (Figs. 4 and 9). The rear end of this spring is secured in the lever 116 by straps 121 that are struck up from the lever 116. The spring 120 engages at its forward end under the short arm of a bell crank lever 125 (Fig. 7) that is pivoted on stud 126. The long arm of this lever 125 engages at its lower end against a lug 127 (Fig. 8) projecting laterally forward from the bar 35. Thus, when the lever 90 (Fig. 1) is moved downwardly the spring 120 serves to rock the bell crank lever 125 and move the type bar 35 resiliently to the right. It will move to the right until it contacts the printing segment 41 which is furthermost to the left in printing position.

Figure 13:
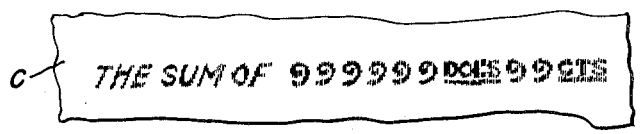
Fig. 13 shows a fragmentary portion of a check printed on the machine of the present invention.
Figure 14:
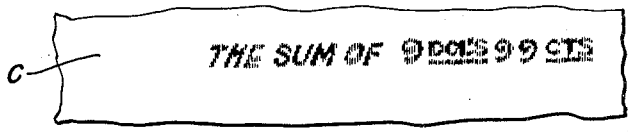
Fig. 14 is a fragmentary view of another check printed on the machine of the present invention.

The five segments 40 of the dollar group are notched as indicated at 125 (Fig. 4) to permit the described movement of bar 35. When one of these segments is in its non-printing position, its notch 125 registers with the bar 35. Hence the bar 35 will move through the notches 125 of all of the segments 40, which are in non-printing position, beginning with the leftmost segment, until it strikes a segment 40 which has been moved to printing position. This permits of printing the words "The sum of," or any other identifying legend carried on the bar 35 directly to the left of the furthest numeral shown on the check. This is illustrated in Figs. 13 and 14, these figures showing that whether all six segments 40 of the dollar group are in printing position, or only one of them, the words "The sum of" will be adjacent the furthermost left of the dollar digits.

In the operation of the machine, the keys 48 are manipulated to set up the type line, and the amount to be printed is read through the window openings 58 in the cover plate 46. In the setting of the printing segments 40 the tapes 50 attached thereto are unrolled corresponding to the setting movement of the segments and the numerals on the tapes, which correspond to the numerals of the set-up segments, appear in the windows 58 and the set-up is thereby clearly indicated and visible. The ink pad 108 is normally in the position shown in Fig. 3. A forward and downward movement of the operating lever 90 effects rotary movement of the shaft 88 which, through the toggle connection 87, 85, causes upward movement of the platen arm 82 upwardly into printing engagement with the type that are in printing position. As the platen is swinging upwardly the carriage 107 is caused to move rearwardly with the pad 108 brushing against the face of the set-up type line. This movement is so timed that the pad passes out of engagement with the type before the platen enters the opening 22. This movement is so timed, also, that the type bar 35 moves as far as it can to the right before the platen enters opening 22. Movement of the carriage is effected through pin 104, strap 105, and the levers 102, and link 101, and arm 100. When the platen rises it pushes the check against the set-up type and the check is imprinted. When the lever 90 is released the springs 95 effect the movement of the platen and its operating parts to their inoperative positions also returning the reciprocating member 107 and ink pad 108 to their normal positions. When the keys 48 are returned to their uppermost positions after the check has been imprinted, the tapes 50 automatically recoil themselves about the plate 60.

While the invention has been described in connection with a specific embodiment thereof, it will be understood that it is capable of further modification, and this application is intended to cover any variations, uses, or adaptations of the invention following, in general, the principles of the invention and including such departures from the present disclosure as come within known or customary practice in the art to which the invention pertains and as fall within the scope of the invention or the limits of the appended claims.

Having thus described my invention, what I claim is:

1. A check writer comprising a casing, a shaft mounted in said casing, a plurality of independently rotatable members mounted on said shaft and each including a segmental portion having type forms arranged thereon columnwise about its axis of rotation, means secured to each of said rotatable members for rotating said member from the exterior of said casing to bring a selected type form into printing position, a platen movably mounted in said casing to cooperate with the type forms, that are in printing positions, to effect a check-printing operation, a normally coiled, flexible indicating tape secured at one end to each rotatable member to be unwound as each said member is rotated in one direction about its axis to bring its type forms into printing position, each said tape having indicating characters arranged columnwise thereon corresponding to the type forms on each said member, and windows in said casing through which said indicating characters may be viewed successively as the different rotatable members are adjusted, each of said tapes being constrained to recoil when the associated rotatable member is returned to non-printing position.

2. A check writer comprising a casing, a shaft mounted in said casing, a plurality of independently rotatable members mounted on said shaft and each including a segmental portion having type forms arranged thereon columnwise about its axis of rotation, means secured to each of said rotatable members for rotating said member from the exterior of said casing to bring a selected type form into printing position, a platen movably mounted in said casing to cooperate with the type forms that are in printing positions, to effect a check-printing operation, an indicating strap secured to each rotatable member to move therewith, each of said straps comprising a normally-coiled, flexible tape having indicating characters arranged columnwise thereon corresponding to the type forms on the associated rotatable member, means for guiding a portion of each strap so that it is inclined both to the vertical and to the horizontal, and a window in said casing registering with each strap and inclined both to the vertical and horizontal so that successive indicating characters of the straps may readily be read.

3. A check writer comprising a casing, a shaft mounted in said casing, a plurality of independently rotatable members mounted on said shaft and each including a segmental portion having type forms arranged thereon columnwise about its axis of rotation, means secured to each of said rotatable members for rotating said members from the exterior of said casing to bring a selected type form into printing position, a platen movably mounted in said casing to cooperate with the type forms that are in printing positions, to effect a check-printing operation, an indicating strap secured to each rotatable member to move therewith, each of said straps comprising a normally-coiled, flexible tape having indicating characters arranged columnwise thereon corresponding to the type forms on the associated rotatable member, a guide plate over which each strap passes, and a guide member disposed below and forward of said guide plate and under which said strap passes, whereby a portion of said strap is inclined both to the vertical and to the horizontal and a window in said casing registering with said portion of each said strap and through which successive characters of the strap may be read.

4. A check writer comprising a casing, a shaft mounted in said casing, a plurality of independently rotatable members mounted on said shaft and each including a segmental portion having type forms arranged thereon columnwise about its axis of rotation, means secured to each rotatable member for rotating the member from the exterior of said casing to bring a selected type form into printing position, a platen movably mounted in said casing to cooperate with the type forms that are in printing positions, to effect a check-printing operation, a normally-coiled flexible indicating tape secured to each rotatable member at one end to be unwound as said member is rotated in one direction about its axis to bring its type forms into printing position, each said tape having indicating characters arranged columnwise thereon corresponding to the type forms on the associated rotatable member, a guide plate about which each tape is normally coiled and to which each tape is secured at its opposite end, a guide member disposed below and forwardly of said guide plate and under which each tape passes to its associated rotatable member, whereby the portion of each tape between the guide plate and the guide member is inclined to both the horizontal and the vertical, and a window in said casing that is inclined both to the horizontal and to the vertical and through which an indicating character on the said portion of each tape may be viewed.

5. A check writer comprising a casing, a shaft mounted in said casing, a plurality of independently rotatable members mounted on said shaft and each including a segmental portion having type forms arranged thereon columnwise about its axis of rotation, means secured to each rotatable member for rotating the member from the exterior of said casing to bring a selected type form into printing position, a platen movably mounted in said casing to cooperate with the type forms that are in printing positions, to effect a check-printing operation, a normally-coiled flexible indicating tape secured to each rotatable member at one end to be unwound as said member is rotated in one direction about its axis to bring its type forms into printing position, each said tape having indicating characters arranged columnwise thereon corresponding to the type forms on the associated rotatable member, a guide plate about which each tape is normally coiled and to which each tape is secured at its opposite end, a guide member disposed below and forwardly of said guide plate and under which each tape passes to its associated rotatable member, whereby the portion of each tape between the guide plate and the guide member is inclined to both the horizontal and the vertical, and a window in said casing that is inclined both to the horizontal and to the vertical and through which an indicating character on the said portion of each tape may be viewed, said guide member comprising a roller mounted rotatably in the casing, and a rod associated with each said roller and disposed beneath said tape, the tapes passing between said roller and said rod.

References Cited in the file of this patent

UNITED STATES PATENTS

| | | |
|---|---|---|
| 735,463 | Butterworth | Aug. 4, 1903 |
| 773,102 | See | Oct. 25, 1904 |
| 1,556,466 | Willis | Oct. 6, 1925 |
| 1,583,403 | Lien | May 4, 1926 |
| 1,781,620 | Whitmore | Nov. 11, 1930 |
| 1,916,538 | Smith | July 4, 1933 |
| 1,959,186 | Welter | May 15, 1934 |
| 2,108,400 | Barker-Bland | Feb. 15, 1938 |
| 2,111,362 | Fischer | Mar. 15, 1938 |
| 2,211,680 | Whitaker | Aug. 13, 1940 |
| 2,249,627 | Drucker | July 15, 1941 |
| 2,428,560 | Faust | Oct. 7, 1947 |
| 2,517,354 | Rostock | Aug. 1, 1950 |
| 2,598,438 | Petermann | May 27, 1952 |
| 2,664,633 | Reich | Jan. 5, 1954 |